United States Patent
Mawby

(10) Patent No.: US 10,247,640 B2
(45) Date of Patent: Apr. 2, 2019

(54) TIRE UNIFORMITY IMPROVEMENT THROUGH IDENTIFICATION OF MEASUREMENT PROCESS HARMONICS USING MULTIPLE REVOLUTIONS IN A UNIFORMITY MEASUREMENT MACHINE

(71) Applicants: William David Mawby, Greenville, SC (US); COMPAGNIE GENERALE DES ETABLISSEMENTS MICHELIN, Clermont-Ferrand (FR); MICHELIN RECHERCHE et TECHNIQUE S.A., Granges-Paccot (CH)

(72) Inventor: William David Mawby, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 132 days.

(21) Appl. No.: 15/500,141

(22) PCT Filed: Jul. 31, 2014

(86) PCT No.: PCT/US2014/049151
§ 371 (c)(1),
(2) Date: Jan. 30, 2017

(87) PCT Pub. No.: WO2016/018368
PCT Pub. Date: Feb. 4, 2016

(65) Prior Publication Data
US 2017/0241869 A1 Aug. 24, 2017

(51) Int. Cl.
*G01M 17/02* (2006.01)
*B29D 30/00* (2006.01)
*B29D 30/06* (2006.01)

(52) U.S. Cl.
CPC ....... *G01M 17/024* (2013.01); *B29D 30/0061* (2013.01); *B29D 30/0633* (2013.01);
(Continued)

(58) Field of Classification Search
None
See application file for complete search history.

(56) References Cited

U.S. PATENT DOCUMENTS 4,458,451 A * 7/1984 Rogers ............... B24B 5/366
451/1
6,405,146 B1 6/2002 Engel
(Continued)

FOREIGN PATENT DOCUMENTS

EP 1134573 9/2001
EP 2626684 8/2013
(Continued)

OTHER PUBLICATIONS

PCT International Search Report for corresponding PCT Application No. PCT/US2014/049151, dated Dec. 5, 2014—2 pages.
(Continued)

*Primary Examiner* — Paul M. West
*Assistant Examiner* — Mark A Shabman
(74) *Attorney, Agent, or Firm* — Dority & Manning, P.A.

(57) ABSTRACT

Methods and systems for improving the uniformity of a tire are provided. More particularly, one or more parameters of a measurement process harmonic contributing to uniformity measurements performed for a tire can be identified. The measurement process harmonic can be a process harmonic effect associated with the acquisition of uniformity measurements of a tire, such as a process harmonic effect associated out-of-roundness of a road wheel used to load a tire during uniformity measurement in a uniformity measurement machine. The measurement process harmonic can result
(Continued)

solely from the acquisition of uniformity measurements and may not contribute to actual tire non-uniformity. Once identified, the one or more parameters associated with the measurement process harmonic can be used to correct the uniformity measurements of the tire to account for the measurement process harmonic. Tire manufacture can then be modified to improve tire uniformity based on the corrected measurements.

12 Claims, 6 Drawing Sheets

(52) U.S. Cl.
CPC ..... *G01M 17/02* (2013.01); *B29D 2030/0066* (2013.01); *B29D 2030/0634* (2013.01); *B29D 2030/0635* (2013.01)

(56) References Cited

U.S. PATENT DOCUMENTS

| | | | |
|---|---|---|---|
| 6,496,834 | B1 | 12/2002 | Cereghini et al. |
| 2003/0112234 | A1 | 6/2003 | Brown et al. |
| 2005/0081614 | A1* | 4/2005 | Zhu .............. G01M 17/02 73/146 |
| 2006/0031024 | A1 | 2/2006 | Mountassir |
| 2012/0031179 | A1 | 2/2012 | Mawby |
| 2012/0035757 | A1 | 2/2012 | Mawby et al. |
| 2012/0095587 | A1 | 4/2012 | Hair, Jr. et al. |
| 2013/0090879 | A1 | 4/2013 | Estor et al. |
| 2013/0098148 | A1* | 4/2013 | Mawby .......... G01M 17/02 73/146 |
| 2013/0253686 | A1 | 9/2013 | Flament et al. |
| 2014/0350879 | A1 | 11/2014 | Takigushi et al. |
| 2015/0300921 | A1* | 10/2015 | Nicholson ....... G01M 17/02 73/146 |

FOREIGN PATENT DOCUMENTS

| | | |
|---|---|---|
| EP | 2745224 | 6/2014 |
| JP | H10/281913 | 10/1998 |
| JP | 2000/234980 | 8/2000 |
| JP | 2005/186790 | 7/2005 |
| JP | 2006/105775 | 4/2006 |
| JP | 2013/210355 | 10/2013 |
| WO | WO 02/099377 | 12/2002 |
| WO | WO 2013/099984 | 4/2013 |
| WO | WO 2014/092722 | 6/2014 |

OTHER PUBLICATIONS

PCT International Search Report for corresponding PCT Application No. PCT/US2014/049165, dated Nov. 19, 2014—2 pages.
PCT International Search Report for corresponding PCT Application No. PCT/US2014/049170, dated Dec. 5, 2014—2 pages.
PCT International Search Report for corresponding PCT Application No. PCT/US2014/049174, dated Dec. 5, 2014—2 pages.
Friendly et al., "Elliptical Insights: Understanding Statistical Methods through Elliptical Geometry," *Statistical Science*, vol. 28, No. 1, Feb. 2013, pp. 1-40.
Nolan, "Multivariate elliptically contoured stable distributions: theory and estimation," American University, Oct. 31, 2006—17 pages.
Sibley, "Weibull Analysis as a Tool for Yield Analysis and Control Charting," M.A. Sibley Consulting, Feb. 24, 2013—38 pages.
Tentzerakis et al., "Evaluation of Wind Farm Harmonic Current Emissions," European Wind Energy Conference & Exhibition Conference, May 7-10, 2007, Milan, Italy—9 pages.
Boudt et al., "Robust and Explicit Estimators for Weibull Parameters," *Metrika*, vol. 73, Issue. 2, Mar. 2011—27 pages.

\* cited by examiner

TIRE UNIFORMITY IMPROVEMENT THROUGH IDENTIFICATION OF MEASUREMENT PROCESS HARMONICS USING MULTIPLE REVOLUTIONS IN A UNIFORMITY MEASUREMENT MACHINE

FIELD

The present disclosure relates to tire uniformity and more particularly to improving the uniformity of tires by identification of measurement process harmonics using multiple tire revolutions in a tire uniformity measurement machine.

BACKGROUND

Tire non-uniformity relates to the symmetry (or lack of symmetry) relative to the tire's axis of revolution in certain quantifiable characteristics of a tire. Conventional tire building methods unfortunately have many opportunities for producing non-uniformities in tires. During revolution of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity parameters, or attributes, are generally categorized as dimensional or geometric variations (radial run out and lateral run out), mass variance, and rolling force variations (radial force variation, lateral force variation and tangential force variation, sometimes also called longitudinal or fore and aft force variation). Uniformity measurement machines often calculate the above and other uniformity characteristics by measuring force at a number of points around a tire as the tire is rotated about its axis to generate a uniformity waveform.

Many different factors can contribute to the presence of uniformity characteristics in tires. Uniformity dispersions in tires can result from both tire harmonic effects and process harmonic effects. Tire harmonic effects or "tire harmonics" have periods of variation that coincide with the tire circumference (e.g. fit an integer number of times within the tire circumference). Tire harmonics can be attributable to tread joint width, out-of-roundness of the building drums, curing press effects, and other effects.

Process harmonic effects or "process harmonics" have periods of variation that do not coincide with the tire circumference (e.g. do not fit an integer number of times within the tire circumference). Process harmonics are generally related to process elements rather than tire circumference. Process harmonic effects can be caused, for instance, by the uniformity measurement machine itself due to non-uniformities in a road wheel used to load a tire during uniformity measurement. The manifestation of a process harmonic can change from tire to tire depending on the rate of introduction of the process harmonic relative to the tire circumference.

SUMMARY

Aspects and advantages of embodiments of the present disclosure will be set forth in part in the following description, or may be learned from the description, or may be learned through practice of the embodiments.

One example aspect of the present disclosure is directed to a method for improving the uniformity of a tire. The method includes accessing uniformity measurements obtained for a set of a plurality of tires. The uniformity measurements for each tire are obtained for a plurality of revolutions of the tire in a uniformity measurement machine while loading the tire with a road wheel. The method further includes estimating one or more parameters of a measurement process harmonic associated with the road wheel based at least in part on the uniformity measurements. The method further includes modifying tire manufacture based at least in part on the measurement process harmonic associated with the road wheel.

Another example aspect of the present disclosure is directed to a system for improving the uniformity of tires. The system includes a uniformity measurement machine configured to obtain uniformity measurements for a set of a plurality of tires. The uniformity measurements for each tire are obtained for a plurality of revolutions of the tire in the uniformity measurement machine while the tire is loaded with a road wheel. The system further includes one or more computing devices in communication with the uniformity measurement machine. The one or more computing devices include computer-readable instructions stored in one or more memory devices that when executed by one or more processors cause the one or more processors to implement one or more aspects of any of the methods for improving the uniformity of a tire disclosed herein.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
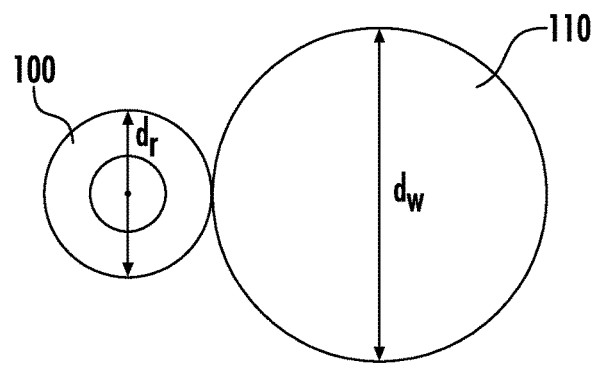
FIG. 1 depicts an example road wheel used to load a tire during the acquisition of uniformity measurements in a uniformity measurement machine according to example aspects of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Example aspects of the present disclosure are directed to methods and systems for improving the uniformity of a tire. More particularly, one or more parameters of a measurement process harmonic contributing to uniformity measurements performed for a tire can be identified. The measurement process harmonic can be a process harmonic effect associated with the acquisition of uniformity measurements of a tire, such as a process harmonic effect associated out-of-roundness of a road wheel used to load a tire during the acquisition of uniformity measurements in a uniformity measurement machine. The measurement process harmonic can result solely from the acquisition of uniformity measurements and may not contribute to actual tire non-uniformity. Once identified, the one or more parameters associated with the measurement process harmonic can be used to correct the uniformity measurements of the tire to account for the measurement process harmonic. Tire manufacture can then be modified to improve tire uniformity based at least in part on the corrected measurements.

More specifically, a uniformity parameter can be analyzed by obtaining a plurality of uniformity measurements at a plurality of discrete data points for one or more revolutions of the tire. The plurality of uniformity measurements performed at the discrete data points can be collectively represented as a uniformity waveform. The uniformity parameter can be, for instance, radial run out, radial force variation, lateral run out, lateral force variation, static balance, tangential force variation or other suitable uniformity parameter. The uniformity waveform can have contributions from both tire harmonics and process harmonics.

A tire harmonic has a period that fits an integer number of times within the tire circumference. Typical tire harmonics can be attributable to tread joint width, out-of-roundness of the building drums, press effects, and other effects. Process harmonics have a period that does not fit an integer number of times within the tire circumference. Typical process harmonics can be caused, for instance, in the preparation of a semi-finished product (e.g. a tread band), by thickness variations due to the extruder control system or by rollers that can deform the shape of softer products.

A process harmonic can be expressed or identified in terms of various parameters, including but not limited to the rate (e.g. frequency or period) of introduction relative to the dimensions of the tire (e.g., tire circumference, radius, diameter, discrete number of data points around the tire or the like). The rate of introduction can also be expressed as a harmonic number (e.g. 1.25, 0.8, etc.). When considering a total number of p candidate process effects, the rate of introduction of each process effect can be defined in terms of its respective harmonic number $h_p$.

A measurement process harmonic is a process harmonic that is attributable to the acquisition of uniformity measurements of a tire, but does not contribute to actual tire non-uniformity. Measurement process harmonics can be effects that appear within uniformity waveforms or other uniformity measurements due to process components used in measuring tire uniformity itself. For example, uniformity measurements can be obtained by rotating a tire for one or more revolutions in a uniformity measurement machine. During the acquisition of uniformity measurements, the tire can be loaded with a road wheel. The purpose of the road wheel is to simulate the tire rolling along a surface for measuring uniformity parameters such as radial force variation, lateral force variation, and/or tangential force variation. Non-uniformity in the road wheel can manifest itself in the uniformity measurements obtained for the tire. The non-uniformity of the road wheel, however, does not contribute to the actual non-uniformity of the tire.

FIG. 1 depicts a representation of an example road wheel 110 used to load a tire 100 during the acquisition of uniformity measurements using a uniformity measurement machine. The road wheel 110 can be slightly out of round or otherwise non-uniform. The non-uniformity of the road wheel 110 can manifest itself in the uniformity measurements obtained for the tire 100 (e.g. in a uniformity waveform). Because the road wheel 110 has a different diameter relative to the tire 100, the period of contributions from the road wheel 110 do not fit an integer number of times within the circumference of the tire 100. Accordingly, the effect attributable to the road wheel is a process harmonic effect.

In the example of FIG. 1, the road wheel 110 can have a diameter of $d_w$ and the tire 100 can have a diameter $d_t$. The diameter $d_w$ of the road wheel 110 can be different from the diameter $d_t$ of the tire 100 such that any contribution of the road wheel 110 to tire uniformity does not have the same period of influence as that of the tire 100 itself. A measurement process harmonic of the road wheel 110 can have a period that is $d_t/d_w = h$ (where h is the harmonic number) in relation to the tire. For example, if $d_t = 1$ meter and $d_w = 1.25$ meters, then the harmonic number of the measurement process harmonic associated with the road wheel 110 can be $1/1.25 = 0.8$ and its effect will manifest itself four times out of every five consecutive tires.

Measurement process harmonics have the potential to alter the uniformity measurements and thus all aspects of tire uniformity management, including tire performance, tire grading, and process control because the uniformity measurements form the basis for all of these operations. For instance, a uniformity waveform can be used to generate Fourier transform values that represent the harmonics of various uniformity parameters, including radial force variation, lateral force variation, and tangential force variation. These harmonic values can be used to determine the suitability for a tire in the market, to determine corrective actions (e.g. grinding, ablation, etc.) and to provide information to the production system for process control and improvement activities. Any error in the uniformity measurements resulting from the measurement process harmonic can cause errors in any of these associated areas.

Figure 2:
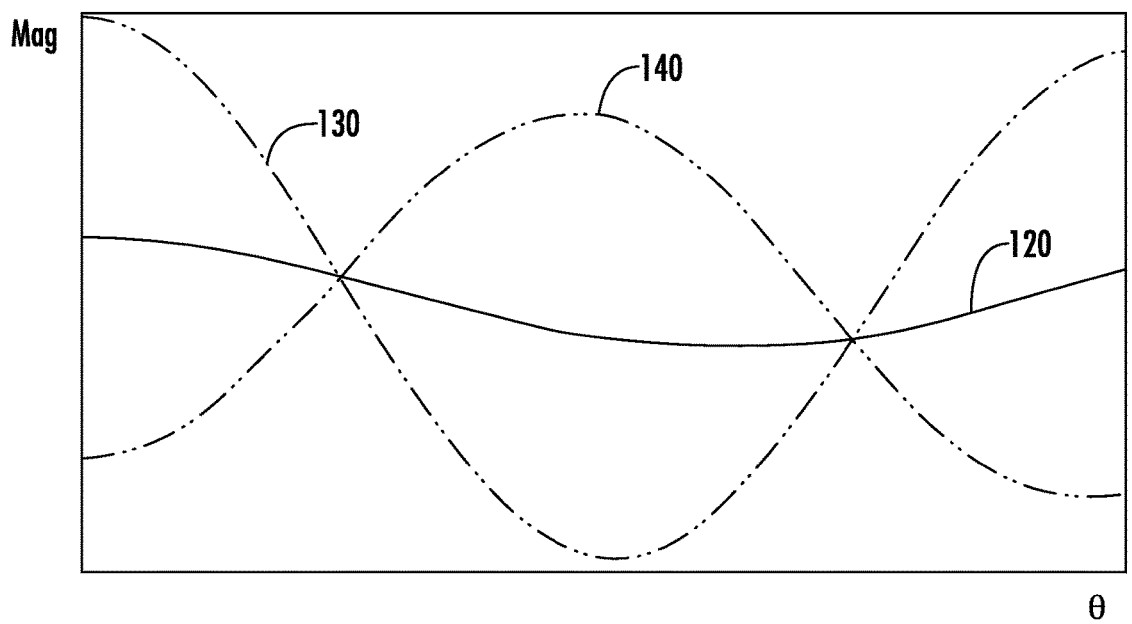
FIG. 2 depicts an example manifestation of a measurement process harmonic in a measured uniformity waveform according to example aspects of the present disclosure.

For instance, the peak (e.g. maximum value) of a measurement process harmonic can occur at different positions relative to that of the tire uniformity depending on the relative indexing of the tire with the road wheel. For example, the peak of the measurement process harmonic can be directly opposite to the normal effect if the tire is rotated 180 degrees while the road wheel remains fixed. This can be more readily understood with reference to FIG. 2, which depicts the manifestation of a measurement process effect 120 at two relative locations of the same tire. FIG. 2 plots azimuth of the tire along the abscissa and magnitude of a uniformity measurement along the ordinate. Waveform 130 can be representative of uniformity measurements obtained when the tire is located at 0 degrees relative to the road wheel. Waveform 140 can be representative of uniformity measurements obtained when the tire is located 180 degrees relative to the road wheel.

As shown in FIG. 2, the measured waveform and any computed quantities (e.g. tire harmonics and other uniformity summary data) from the measured waveform can be affected by the relative positioning of the tire and the measurement process harmonic. In many instances, uniformity measurements are obtained for a single revolution of the tire with a randomly occurring angle between the road wheel and the tire. Accordingly, the measured uniformity parameters (e.g. harmonics) for each individual tire can be altered in a random fashion by the measurement process effect, even though the measurement process effect does not contribute to tire non-uniformity.

According to example aspects of the present disclosure, tire uniformity can be improved by correcting uniformity measurements for measurement process harmonic effects, such as effects due to a non-uniform road wheel. More particularly, uniformity measurements (e.g. a uniformity waveform) can be obtained for multiple revolutions of a tire in a uniformity measurement machine while the tire is loaded with a road wheel. For example, uniformity measurements can be obtained over two or more consecutive measurement revolutions without removing the tire from the road wheel surface or without dismounting the tire from the uniformity measurement surface. Uniformity measurements can be obtained for non-consecutive revolutions as well.

Figure 3:
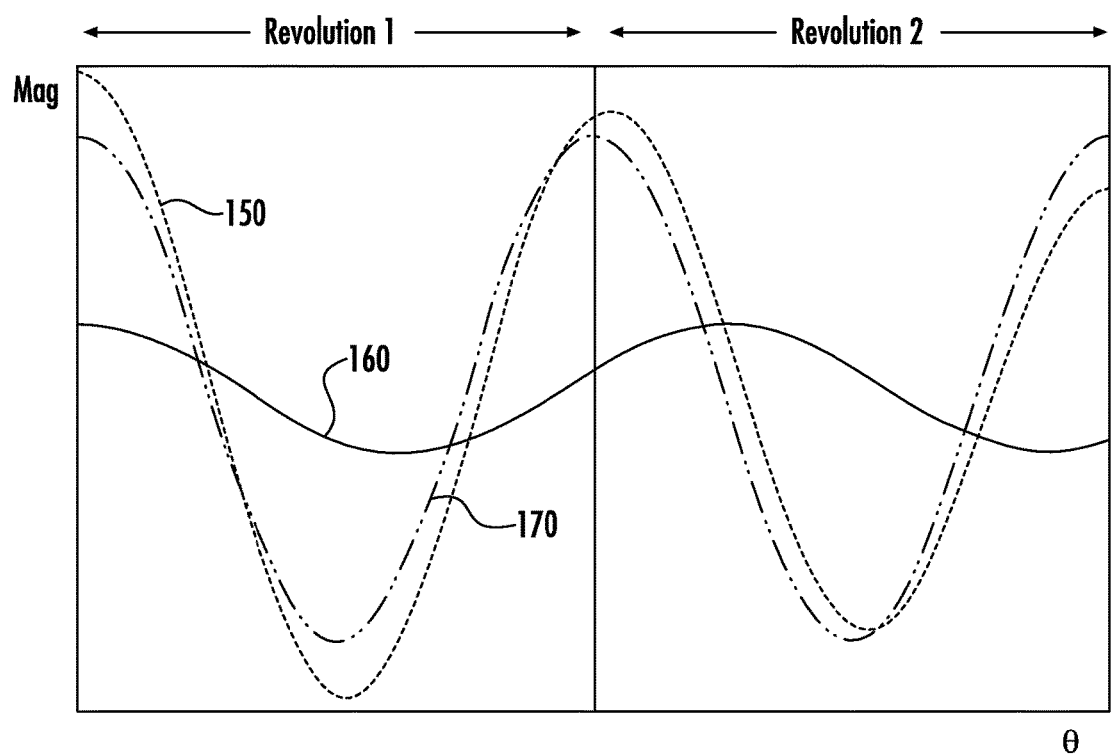
FIG. 3 depicts an example manifestation of a measurement process harmonic across multiple revolutions of a tire according to example aspects of the present disclosure.

FIG. 3 depicts example an example measured uniformity waveform 150 obtained for multiple revolutions of a tire in a uniformity measurement machine according to example embodiments of the present disclosure. FIG. 3 plots azimuth of the tire along the abscissa and magnitude of the measured uniformity parameter along the ordinate. Waveform 150 can result from any tire harmonics 170 as well as the measurement process harmonic 160 attributable to a road wheel. As shown, the peak of the uniformity waveform changes its azimuthal location between the first revolution and the second revolution as a result of the measurement process harmonic 160.

Example aspects of the present disclosure exploit the difference in the manifestation of the measurement process harmonic across the multiple revolutions of the tire in the uniformity measurement machine to estimate one or more parameters of the measurement process effect, such as the magnitude and frequency (e.g. harmonic number) of the measurement process effect. More particularly, uniformity measurements for multiple revolutions of a set of test tires can be accessed. The uniformity measurements can be analyzed to identify one or more parameters of the measurement process harmonic.

In one example embodiment of the present disclosure, data indicative of observed changes in variance across multiple revolutions of a set of test tires (e.g. 25 tires) can be analyzed to estimate one or more parameters of a measurement process effect. The data indicative of the changes in variance in the uniformity measurements can be used to identify one or more parameters of the process harmonic. For instance, one or more parameters associated with the measurement process harmonic can be identified based at least in part on the data indicative of the changes in variance using, for instance, a look up table or model correlating the variance with the magnitude and/or frequency of the measurement process harmonic.

In another example embodiment of the present disclosure, uniformity measurements (e.g. uniformity waveforms) associated with a first revolution and a second revolution can be modeled using a mathematical model. Coefficients and other aspects of the models can be estimated (e.g. using non-linear regression analysis or simulated waveforms) from uniformity measurements obtained for the set of tires. One or more parameters associated with the measurement process harmonic can be identified from the estimated coefficients.

Tire manufacture can be modified by using the one or more parameters of the measurement process harmonic to correct uniformity measurements for tires. For instance, uniformity measurements for each tire can be corrected individually using the measurement process harmonic if one can track the relative position of the road wheel to the tire on each measurement cycle. Alternatively, a large dataset of uniformity measurements for a large number of tires can be corrected using the identified measurement process harmonic. The corrected uniformity measurements can provide a more accurate representation of the uniformity of the tire by cleansing the measurements of any effects attributable solely to measuring uniformity, such as effects resulting from the road wheel. Use of the corrected uniformity measurements can result in higher uniformity yield and improved process control for tire uniformity.

Example Methods for Improving the Uniformity of a Tire

Figure 4:
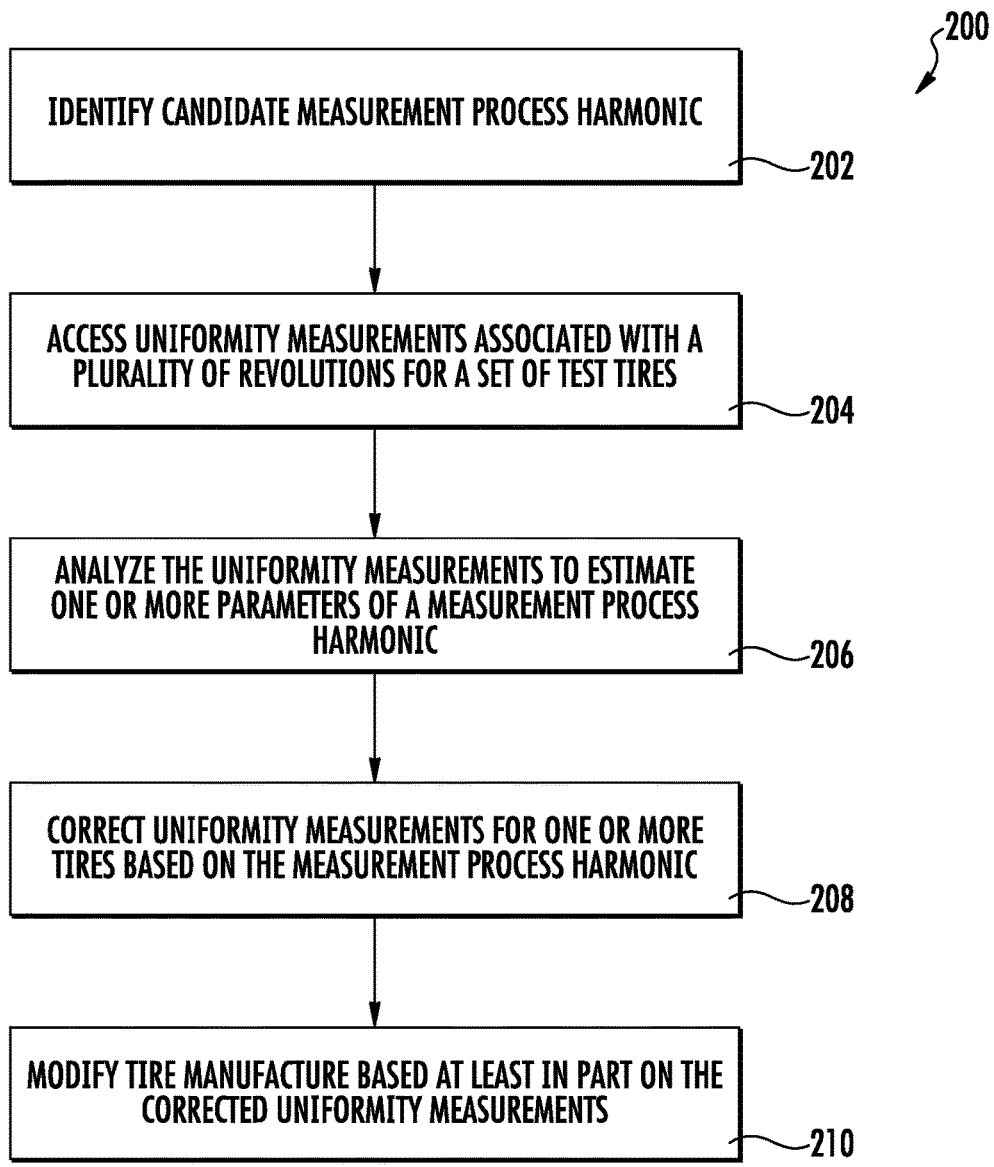
FIG. 4 depicts a flow diagram of an example method for improving tire uniformity according to example aspects of the present disclosure.

FIG. 4 depicts a flow diagram of an example method (200) for improving the uniformity of a tire according to example aspects of the present disclosure. FIG. 4 depicts steps performed in a particular order for purposes of illustration and discussion. Those of ordinary skill in the art, using the disclosures provided herein, will understand that any of the methods disclosed herein can be omitted, rearranged, expanded, adapted, and/or modified in various ways without deviating from the scope of the present disclosure.

At (202), the method includes identifying a candidate measurement process harmonic. The candidate measurement process harmonic can be identified as a contribution to uniformity measurements from process elements used to measure or acquire uniformity data, such as contributions due to out-of-roundness of a road wheel used to load a tire in the uniformity measurement machine.

At (204), the method includes accessing uniformity measurements for a set of a plurality of test tires acquired using the process element associated with the identified candidate measurement process harmonic. For example, the uniformity measurements for the set of tires can be acquired using a uniformity measurement machine while loading the tire with the road wheel.

The uniformity measurements can correspond to any suitable uniformity parameter. For instance, the uniformity measurements can correspond, for example, to such uniformity parameters as radial force variation (RFV), lateral force variation (LFV), tangential force variation (TFV), and other parameters. In one implementation, the uniformity measurements can include one or more uniformity waveforms for each tire in the set of test tires. The uniformity waveform can provide data indicative of the magnitude of the uniformity parameter at a plurality of discrete data points about the azimuth of the tire. Alternatively and/or in addition, the uniformity measurements can include uniformity summary data for each tire in the set of test tires. The uniformity summary data can include the magnitude and/or phase angle of one or more harmonics of a uniformity parameter of interest, such as the first harmonic of radial force variation.

The number of test tires can be selected to provide a proper sample for identification of a measurement process harmonic according to example aspects of the present disclosure. For instance, in one particular implementation, the number of test tires can be in the range of 10 to 50 test tires, such as 25 test tires. The uniformity measurements can be accessed from a database of historical uniformity data obtained for a set of test tires stored, for instance, in a memory device or can be physically measured using a set of test tires.

According to example aspects of the present disclosure, the uniformity measurements are obtained for a plurality of revolutions of the test tire in the uniformity measurement machine. For instance, uniformity measurements can be obtained over two or more consecutive measurement revolutions of each test tire without removing the tire from the road wheel surface or without dismounting the tire from the uniformity measurement surface. Differences in the uniformity measurements between the two or more revolutions of the test tires can be analyzed to identify one or more parameters of the measurement process harmonic.

More particularly, at (206), the method includes analyzing the uniformity measurements to estimate one or more parameters of a measurement process harmonic. In one implementation, data indicative of a set of variances of the uniformity measurements can be used to estimate the size and frequency of the measurement process harmonic. Example methods for estimating one or more parameters of a measurement process harmonic using data indicative of variances are discussed with reference to FIG. 5. In other implementations, uniformity data can be modeled and simulated based on the uniformity measurements. The models be analyzed to identify one or more parameters of the measurement process harmonic. Example methods for identifying one or more measurement process harmonics by modeling uniformity measurements will be discussed with reference to FIGS. 6 and 7. Other suitable techniques can be used to estimate one or more parameters of a measurement process harmonic without deviating from the scope of the present disclosure.

Once the one or more parameters associated with the measurement process harmonic have been obtained, tire manufacture can be modified based on the one or more parameters of the measurement process harmonic to improve tire uniformity. One example method for modifying tire manufacture includes correcting uniformity measurements obtained for tires using the one or more parameters of the measurement process harmonic.

More particularly, at (208) of FIG. 4, the uniformity measurements for one or more tires can be corrected using the one or more parameters identified for the measurement process harmonic. For instance, uniformity measurements for an individual tire can be corrected by subtracting out the measurement process harmonic if the relative position of the tire to the road wheel is tracked during each cycle. A distribution of uniformity measurements for a plurality of tires can also be improved even if correction of an individual tire cannot be accomplished. For instance, the distribution of uniformity measurements can be adjusted to have a corrected variance determined based at least in part on the one or more measurement process harmonics. The corrected variance can be computed based on an expected change in variance resulting from the measurement process harmonic.

At (210), the method can include modifying tire manufacture based at least in part on the corrected uniformity measurements. For instance, the tire manufacture can be modified by sorting and/or grading tires based at least in part on the corrected uniformity measurements. As another example, tire manufacture can be modified by determining the need for corrective actions (e.g. grinding, ablation, etc.) based on the corrected uniformity measurements. As yet another example, tire harmonics and other process harmonics can be identified from the corrected uniformity measurements to provide information to the production system for process control and improvement activities Correcting uniformity measurements for measurement process harmonics according to example aspects of the present disclosure can lead to an increase in uniformity yield of up to 5% when considering realistic assumptions about the sizes and distributions of uniformity measurements for a set of tires. Because measurement process harmonics do not directly affect tire uniformity, the increased uniformity yield does not have a direct effect on tire performance. Correcting uniformity measurements according to aspects of the present disclosure can also improve tire performance by reducing unnecessary grinding or other correction of tires when such correction is not needed.

Example Estimation of Measurement Process Harmonic Using Set of Variances

Figure 5:
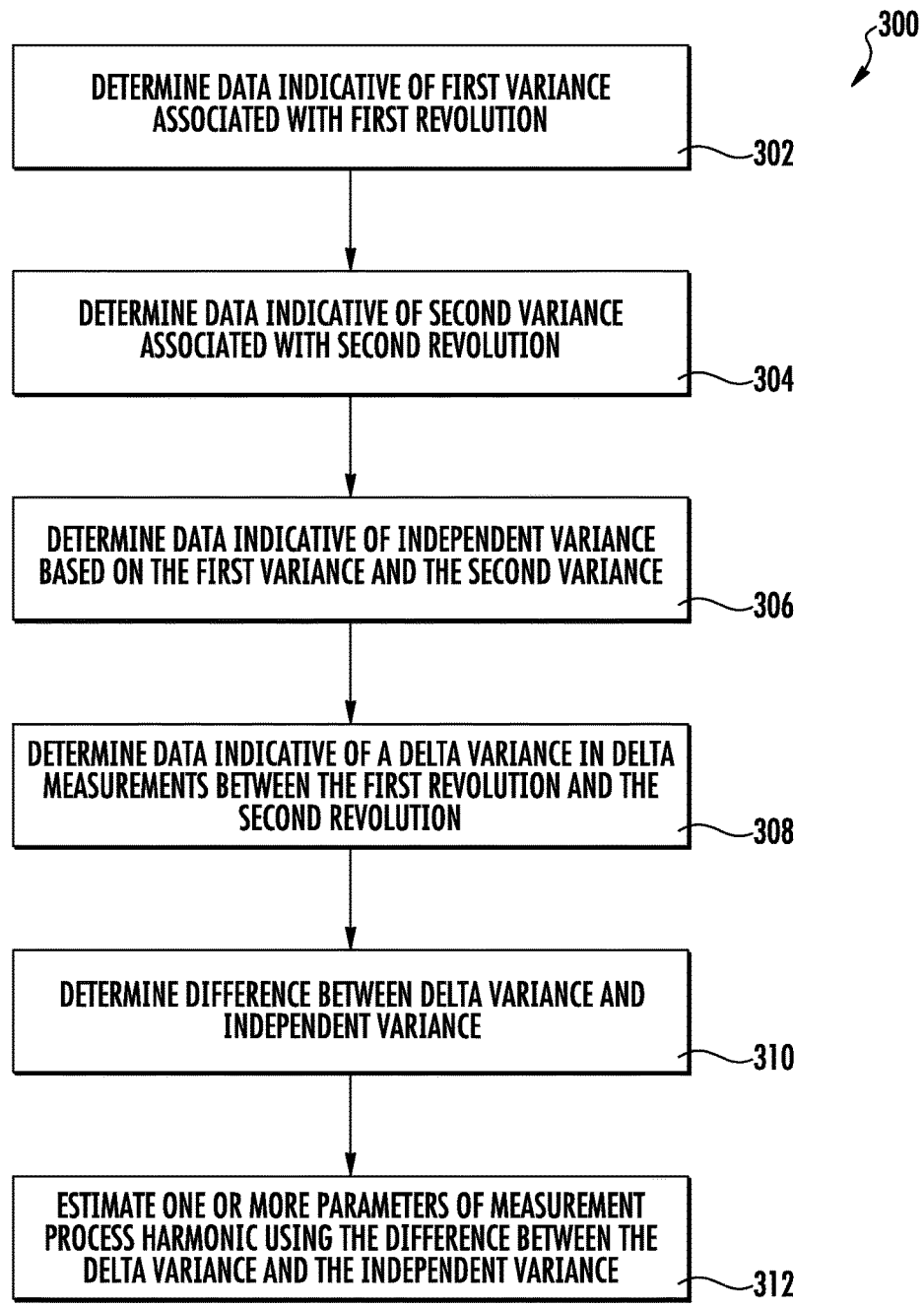
FIG. 5 depicts a flow diagram of an example method for estimating one or more parameters of a measurement process harmonic according to example aspects of the present disclosure.

FIG. 5 depicts a flow diagram of an example method (300) for estimating one or more parameters associated with a measurement process harmonic according to example aspects of the present disclosure. The method (300) can be implemented by one or more computing devices, such as one or more of the computing devices depicted in FIG. 8. The method (300) refers to data indicative of certain variances. As used herein, data indicative of a variance can include any information indicative of the variation of data and can include metrics such as variance, standard deviation, and/or other metrics.

At (302) of FIG. 5, the method includes determining data indicative of a first variance associated with uniformity measurements obtained for a first revolution of the set of test tires in the uniformity measurement machine. For instance, a set of uniformity summary data (e.g. magnitudes of a uniformity parameter) associated with a first revolution of each test tire can be accessed and analyzed to determine a statistical variance in the uniformity data about a mean or other average value.

At (304), the method includes determining data indicative of a second variance associated with uniformity measurements obtained for a second revolution of the set of test tires in the uniformity measurement machine. For instance, a set of uniformity summary data (e.g. magnitudes of a uniformity parameter) associated with a second revolution of each test tire can be accessed and analyzed to determine a statistical variance in the uniformity data about a mean or other average value.

At (306), data indicative of an independent variance can be determined based at least in part on the first variance and the second variance. For instance, the first variance and the second variance can be summed to determine the independent variance.

At (308), data indicative of a delta variance can be determined from the plurality of uniformity measurements. The delta variance can be a measure of the variance of delta measurements between the uniformity data associated with multiple revolutions of each test tire in a uniformity measurement machine. More particularly, a delta measurement can be determined for each test tire as a difference between a uniformity measurement associated with first revolution and a uniformity measurement associated with a second revolution. The set of delta measurements for the set of test tires can be analyzed to determine a statistical variance in the delta measurements about a mean or other average value.

At (310), a difference between the data indicative of the independent variance and the data indicative of the delta variance can be determined. For instance, a percentage difference between an independent variance and a delta variance can be determined for the set of test tires.

At (312), one or more parameters associated with the measurement process harmonic can be estimated based at least in part on the difference between the independent variance and the delta variance. For instance, a look up table or other model correlating the difference between the independent variance and the delta variance with one or more parameters associated with the measurement process harmonic can be accessed and used to identify the one or more parameters.

For instance, Table 1 below provides differences in variances based on different simulated measurement process harmonic magnitude scenarios.

TABLE 1

| Magnitude | First Var. | Second Var. | Independent Var. | Delta Var. | % Difference |
|---|---|---|---|---|---|
| 0.5 | 0.27 | 0.27 | 0.54 | 0.46 | 14.8% |
| 1.0 | 0.57 | 0.60 | 1.17 | 0.91 | 22.2% |
| 1.5 | 1.11 | 1.14 | 2.25 | 1.64 | 27.1% |
| 2.0 | 1.83 | 1.88 | 3.71 | 2.65 | 28.8% |

Table 2 below provides differences in variances based on different simulated measurement process harmonic numbers

TABLE 2

| Harmonic # | First Var. | Second Var. | Independent Var. | Delta Var. | % Difference |
|---|---|---|---|---|---|
| 0.55 | 0.54 | 0.51 | 1.05 | 0.91 | 13.3% |
| 0.65 | 0.48 | 0.37 | 0.85 | 1.78 | −109.4% |
| 0.75 | 0.59 | 0.66 | 1.25 | 0.91 | 27.2% |
| 0.85 | 0.65 | 0.72 | 1.37 | 0.71 | 48.2% |
| 0.95 | 0.61 | 0.60 | 1.21 | 0.37 | 69.4% |
| 1.05 | 0.65 | 0.62 | 1.27 | 0.34 | 73.2% |
| 1.15 | 0.62 | 0.57 | 1.19 | 0.70 | 41.2% |
| 1.25 | 0.59 | 0.58 | 1.17 | 1.31 | −12.0% |
| 1.35 | 0.53 | 0.59 | 1.12 | 1.50 | −33.9% |
| 1.45 | 0.37 | 0.37 | 0.74 | 1.45 | −95.9% |
| 1.55 | 0.29 | 0.28 | 0.57 | 1.55 | −171.9% |

As demonstrated, the difference between the independent variance and the delta variance is affected by magnitude and frequency of the measurement process harmonic. A comprehensive table can be generated from theoretical relationships or simulated data correlating the difference between independent variance and the delta variance with particular measurement process harmonic magnitudes and frequencies.

Example Estimation of Measurement Process Harmonics from Observed Magnitudes

Figure 6:
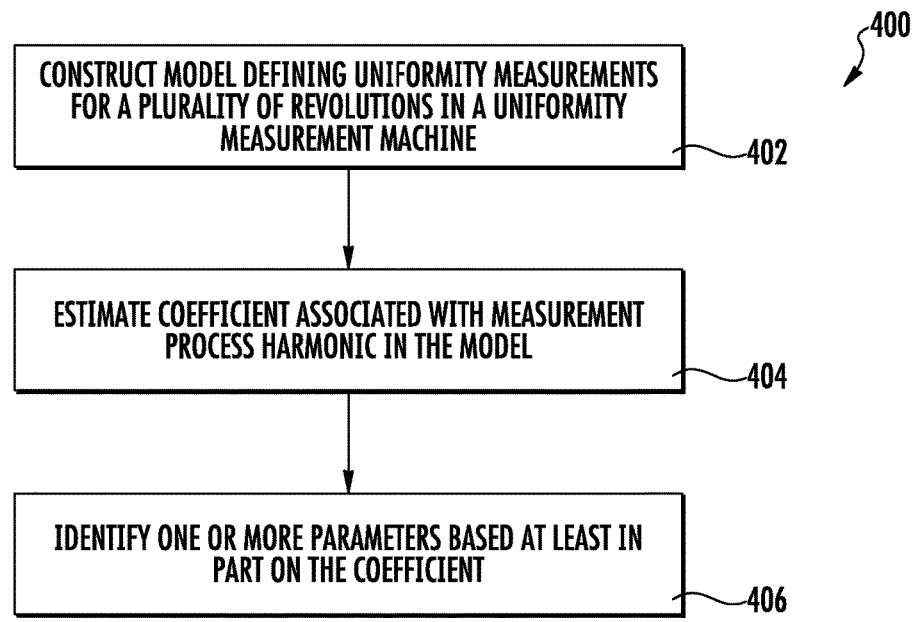
FIG. 6 depicts a flow diagram of an example method for estimating one or more parameters of a measurement process harmonic according to example aspects of the present disclosure.

FIG. 6 depicts a flow diagram of an example method (400) for estimating one or more parameters associated with a measurement process harmonic according to example aspects of the present disclosure. The method (400) can be implemented by one or more computing devices, such as one or more of the computing devices depicted in FIG. 8.

At (402), the method includes constructing a model correlating differences in uniformity measurements between a plurality of revolutions of a tire in a uniformity measurement machine with a measurement process harmonic. The model can be constructed from the uniformity measurements (e.g. harmonic magnitudes) obtained for the set of test tires. The model can include a term associated with the measurement process harmonic.

For instance, a model associated with a first revolution of a tire in a uniformity measurement machine can be constructed as follows:

$$w_i^1 = \sum_{i=1}^{n} \left( A_m \cos\left(\frac{2\pi i m}{N}\right) \right) + \sum_{j=1}^{K} \left( B_{tj} \cos\left(\frac{2\pi i t_j}{N}\right) \right)$$

$w_i^1$ is the magnitude of the uniformity parameter at each data point i of N data points for the first revolution of the tire. $B_{tj}$ and $t_j$ are coefficients associated with each tire harmonic $t_j$ of K tire harmonics. $A_m$ and m are coefficients associated with a measurement process harmonic term.

A model associated with a second revolution of the tire in a uniformity measurement machine can be constructed as follows:

$$w_i^2 = \sum_{i=1}^{n} \left( A_m \cos\left(\frac{2\pi (i+N) m}{N}\right) \right) + \sum_{j=1}^{K} \left( B_{tj} \cos\left(\frac{2\pi i t_j}{N}\right) \right)$$

$w_i^2$ is the magnitude of the uniformity parameter at each data point i of N data points for the second revolution of the tire. $B_{ij}$ and $t_j$ are coefficients associated with each tire harmonic $t_j$ of K tire harmonics. $A_m$ and m are coefficients associated with a measurement process harmonic term.

A model associated with the differences in the uniformity measurements between the first revolution and the second revolution of the tire in a uniformity measurement machine can be constructed as follows:

$$\Delta = w_i^1 - w_i^2 = \sum_{i=1}^{n} \left( A_m \cos\left(\frac{2\pi (i+N) m}{N}\right) - \cos\left(\frac{2\pi i m}{N}\right) \right)$$

$\Delta$ is the difference in uniformity measurements at each data point i of N data points. $A_m$ and m are coefficients associated with a measurement process harmonic term.

At (404), the method includes estimating coefficients for the constructed models. For instance, in one embodiment, the coefficients $A_m$ and m can be estimated using non-linear regression or other statistical analysis to fit the model to the observed uniformity measurements for the set of test tires.

At (406), the method includes identifying one or more parameters based at least in part on the coefficients. For instance, the coefficient $A_m$ can be determined to be the magnitude of measurement process harmonic. The coefficient m can be determined to be the process harmonic number of frequency of the measurement process harmonic.

In another example embodiment, the coefficients $A_m$ and the unknown harmonic number m can be estimated by using a look-up table generated by simulation. The simulation uses the models above to generate the waveforms for two revolutions of the tire in the uniformity measurement machine and the resulting difference between the waveforms. Then the peak of the difference is compared to the peak of the first pass waveform by forming the ratio r.

$$r = \frac{\max(\text{difference})}{\max(\text{first\_pass})}$$

Max(difference) is equal to the peak of the simulated difference waveform. Max(first_pass) is equal to the peak of the simulated waveform associated with the first revolution.

Figure 7:
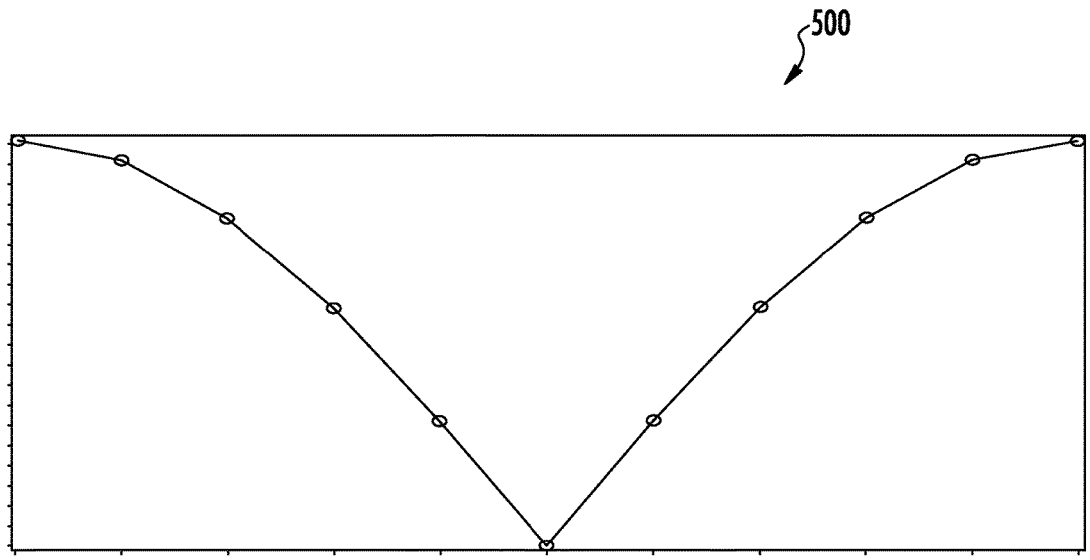
FIG. 7 depicts an example model correlating a ratio derived from simulated waveforms to harmonic number associated with a measurement process harmonic according to example aspects of the present disclosure.

The observed value of r can then be compared, for instance, to the example model depicted in FIG. 7 to estimate the measurement process harmonic number. FIG. 7 plots the ratio along the abscissa and the harmonic number along the ordinate. As an example, a magnitude of 1.8 for the difference would equate to either a measurement process harmonic around 0.86 or to one around 1.14 Simply knowing the relative sizes of the road wheel to the tire (e.g. the road wheel is larger than the tire) leads to selecting the lower value of 0.86 as the harmonic number.

Example System for Improving the Uniformity of a Tire

Figure 8:
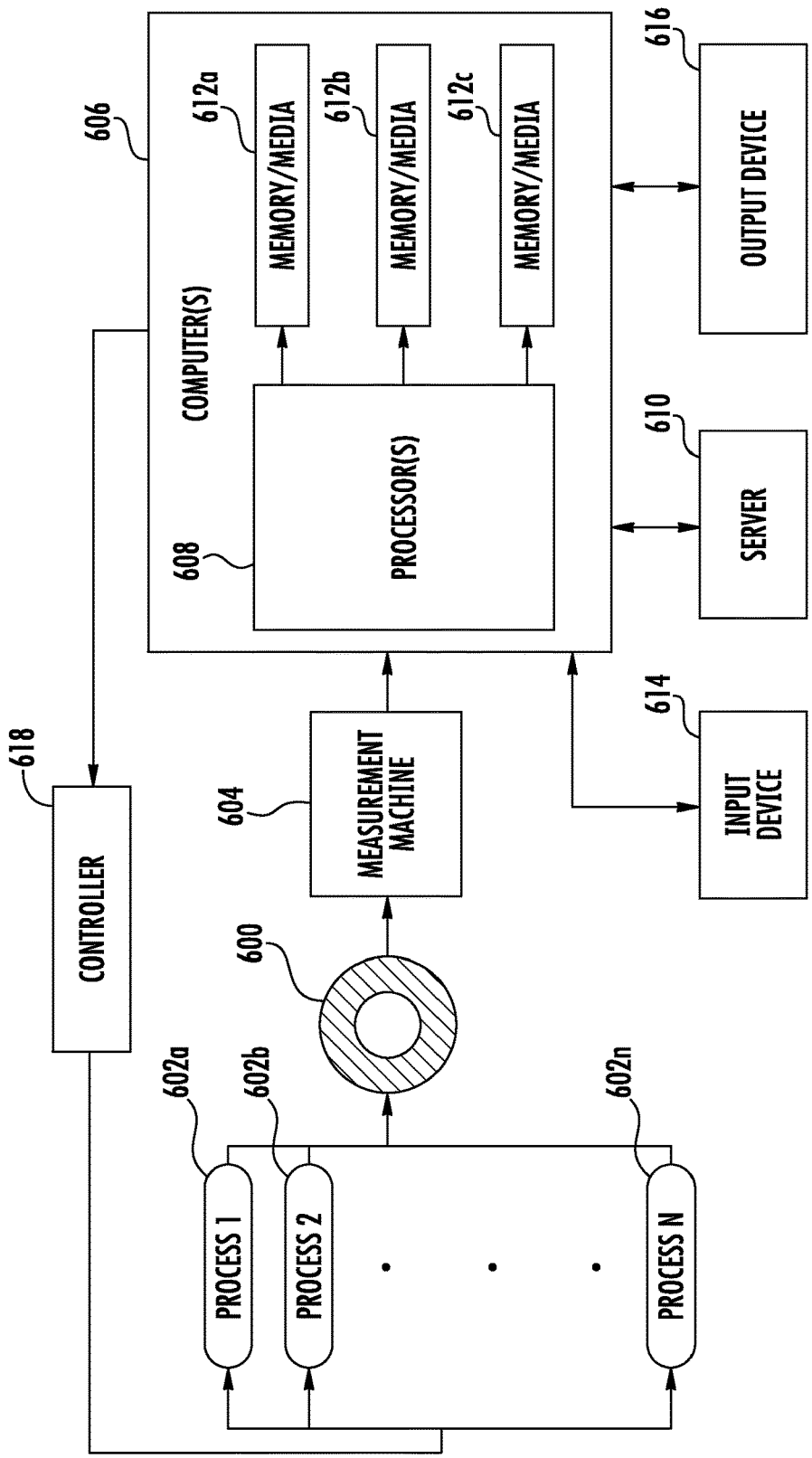
FIG. 8 depicts an example system for improving tire uniformity according to example aspects of the present disclosure.

Referring now to FIG. 8, a schematic overview of example system components for implementing the above-described methods is illustrated. An example tire 600 is constructed in accordance with a plurality of respective manufacturing processes. Such tire building processes may, for example, include applying various layers of rubber compound and/or other suitable materials to form the tire carcass, providing a tire belt portion and a tread portion to form the tire summit block, positioning a green tire in a curing press, and curing the finished green tire, etc. Such respective process elements are represented as 602a, 602b, . . . , 602n in FIG. 8 and combine to form example tire 600. It should be appreciated that a batch of multiple tires can be constructed from one iteration of the various processes 602a through 602n.

Referring still to FIG. 8, a measurement machine 604 is provided to obtain the uniformity measurements of the tire 600. The uniformity measurement machine 604 can be configured to measure uniformity parameters such as radial force variation, lateral force variation, and/or tangential force variation of the tire 600. The uniformity measurement machine 604 can also include a road wheel used to load the tire to obtain force measurements as the tire 600 is rotated.

The measurements obtained by measurement machine 604 can be relayed such that they are received at one or more computing devices 606, which may respectively contain one or more processors 608, although only one computer and processor are shown in FIG. 8 for ease and clarity of illustration. Processor(s) 608 may be configured to receive input data from input device 614 or data that is stored in memory 612. Processor(s) 608, can then analyze such measurements in accordance with the disclosed methods, and provide useable output such as data to a user via output device 616 or signals to a process controller 618. Uniformity analysis may alternatively be implemented by one or more servers 610 or across multiple computing and processing devices.

Various memory/media elements 612a, 612b, 612c (collectively, "612") may be provided as a single or multiple portions of one or more varieties of non-transitory computer-readable media, including, but not limited to, RAM, ROM, hard drives, flash drives, optical media, magnetic media or other memory devices. The computing/processing devices of FIG. 8 can be adapted to function as a special-purpose machine providing desired functionality by accessing software instructions rendered in a computer-readable form stored in one or more of the memory/media elements. When software is used, any suitable programming, scripting, or other type of language or combinations of languages may be used to implement the teachings contained herein.

In one implementation, the processor(s) 608 can execute computer-readable instructions that are stored in one or more of the memory elements 612a, 612b, and 612c to cause the processor to perform operations. The operations can include identifying one or more measurement process harmonics according to example aspects of the present disclosure.

Simulation Results

Two revolutions were made of a set of 99 test tires to collect roughly 4096 measurements per cycle. From a separate analysis the measurement process harmonic associated with the road wheel is estimated to have a harmonic number of 0.75 and a magnitude around 0.80 kgs. Based on simulation results, this measurement process harmonic is expected to result in a decrease in variance on the order of 27% for the differences between first harmonic magnitudes of the two rotations compared to the expected variance of two independent cycles.

The next table shows the results from this actual data to determine a 20.3% reduction in variance which is very close the simulated value of 21.3%. The actual variances are smaller because they are based on 4096 measurements per cycle rather than the 128 points that are used in constructing the simulations.

TABLE 3

| Type | First Var. | Second Var. | Independent Var. | Delta Var. | % Difference |
|---|---|---|---|---|---|
| Simulated | 0.44 | 0.45 | 0.89 | 0.70 | 21.3% |
| Actual | 0.00301 | 0.00309 | 0.00610 | 0.00486 | 20.3% |

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of improving the uniformity of a tire, comprising:
   accessing uniformity measurements of a uniformity parameter obtained for a set of a plurality of test tires, the uniformity measurement for each test tire obtained for a plurality of revolutions of the test tire in a uniformity measurement machine while the test tire is loaded with a road wheel;
   determining data indicative of a variance in the uniformity measurements obtained for the set of test tires by:
      determining a first variance of uniformity measurements associated with a first revolution in the plurality of revolutions for the set of test tires;
      determining a second variance of uniformity measurements associated with the second revolution in the plurality of revolutions for the set of test tires; and
      determining data indicative of an independent variance based at least in part on the first variance and the second variance;
   estimating one or more parameters of a measurement process harmonic associated with the road wheel based at least in part on the data indicative of the variance; and
   modifying tire manufacture based at least in part on the measurement process harmonic associated with the road wheel.

2. The method of claim 1, wherein the one or more parameters of the measurement process harmonic comprise a magnitude and a frequency of the measurement process harmonic.

3. The method of claim 1, wherein determining data indicative of a variance further comprises:
   determining a delta measurement for each tire in the set of test tires, the delta measurement being indicative of the difference between a uniformity measurement associated with a first revolution of the tire and a uniformity measurement associated with a second revolution of the tire; and
   determining a delta variance in the delta measurements for each tire in the set of tires.

4. The method of claim 3, wherein the one or more parameters associated with measurement process harmonics are estimated based at least in part on a difference between the independent variance and the delta variance.

5. The method of claim 1, wherein estimating one or more parameters of a measurement process harmonic comprises:
   constructing a model correlating differences in uniformity measurements between the plurality of revolutions of the test tires in the uniformity measurement machine, the model comprising a measurement process harmonic term;
   estimating one or more coefficients associated with the measurement process harmonic term; and
   identifying the one or more parameters based at least in part on the one or more coefficients.

6. The method of claim 5, wherein estimating one or more coefficients comprises simulating a first pass waveform associated with a first revolution using the model; and
   simulating a difference waveform associated with the difference in the uniformity measurements between the first revolution and a second revolution using the model.

7. The method of claim 6, wherein estimating one or more parameters of a measurement process harmonic further comprises:
   determining a ratio of a peak of the simulated first pass waveform to a peak of the simulated difference waveform; and
   estimating a process harmonic number associated with the measurement process harmonic based at least in part on the ratio.

8. The method of claim 1, wherein modifying tire manufacture based at least in part on the measurement process harmonic comprises correcting uniformity measurements for one or more tires based at least in part on the measurement process harmonic to determine corrected uniformity measurements for the one or more tires.

9. The method of claim 8, wherein tire manufacture is modified based at least in part on the corrected uniformity measurements.

10. The method of claim 9, herein modifying tire manufacture comprises sorting or grading the one or more tires based at least in part on the corrected uniformity measurements.

11. The method of claim 9, wherein modifying tire manufacture comprises analyzing the corrected uniformity measurements of the one or more tires to identify one or more process harmonics or tire harmonics.

12. The method of claim 1, wherein the uniformity parameter comprises one or more of radial force variation, lateral force variation, tangential force variation, or one or more harmonics thereof.

* * * * *